April 21, 1936. P. BRUN 2,038,342
POTATO DIGGER ATTACHMENT
Filed Aug. 8, 1935 3 Sheets—Sheet 1

Inventor
P. Brun
By Clarence A. O'Brien
Attorney

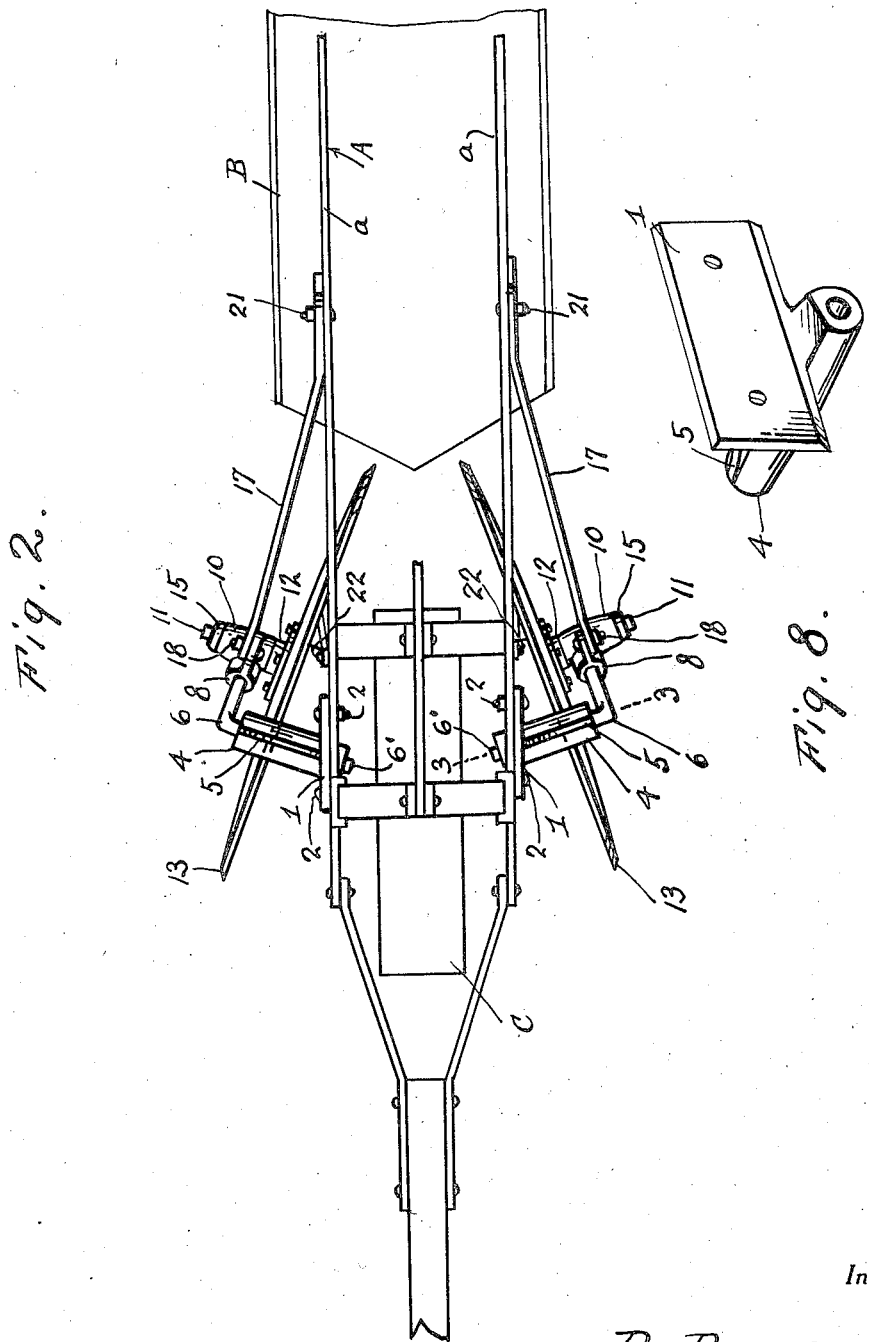

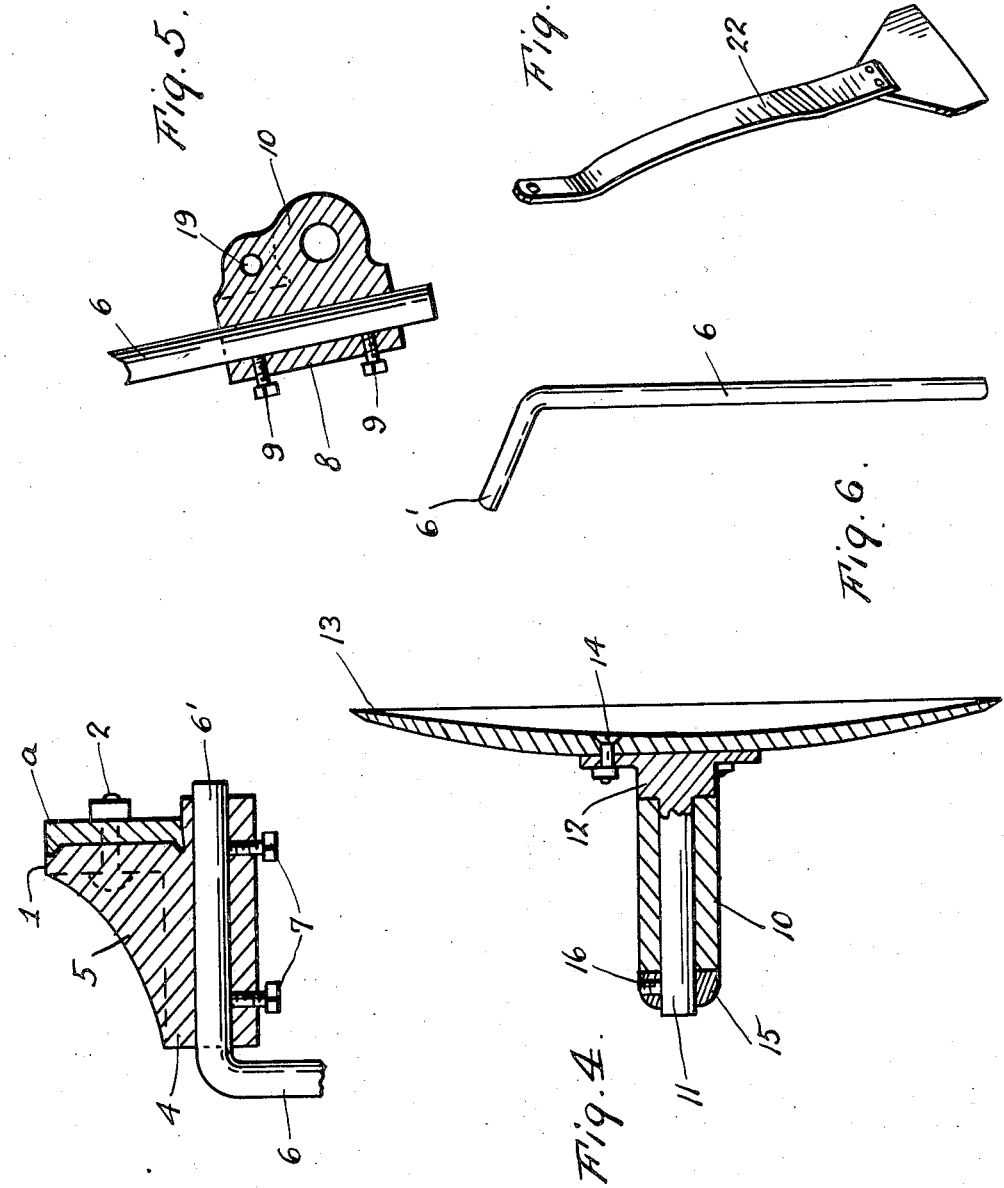

Patented Apr. 21, 1936

2,038,342

UNITED STATES PATENT OFFICE 2,038,342

POTATO DIGGER ATTACHMENT

Prudent Brun, Foley, Minn.

Application August 8, 1935, Serial No. 35,379

2 Claims. (Cl. 55—9)

This invention relates to a potato digger attachment, the general object of the invention being to provide adjustable disks for cutting the weeds and potato tops in advance of the carrier of the machine and to throw the dirt into the center of the row so that weeds and the like between the rows are covered by this dirt.

The device also acts to prevent the potatoes from rolling off before they get on the carrier and to prevent weeds and the like from bunching upon the end of the carrier which would act to hold back the dirt and potatoes from going up the carrier.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views and in which:—

Figure 2 is a top plan view of parts of the machine with the invention thereon.

Figure 3 is a section on the line 3—3 of Figure 2.

Figure 4 is a sectional view through one of the disks and its bearing parts.

Figure 5 is a sectional view through the bearing parts on the lower end of the supporting rod.

Figure 6 is a view of the supporting rod.

Figure 7 is a view of the scraper.

Figure 8 is a view of the upper bracket of the supporting rod.

Figure 1:
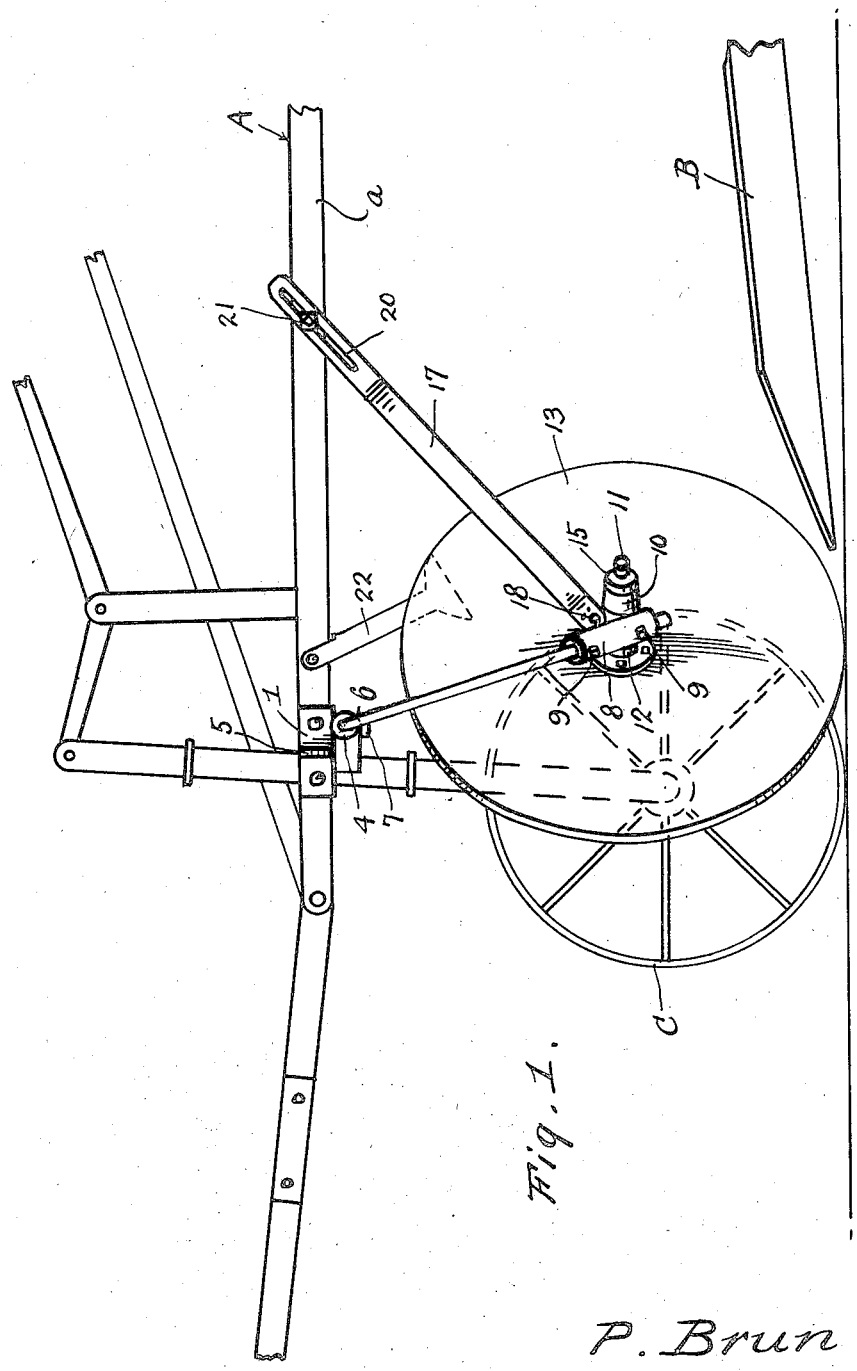
Figure 1 is a fragmentary elevation of a potato digging machine showing the invention used thereon.

In these drawings the letter A indicates a part of the frame of the potato digging machine, the letter B a part of the carrier and the C the front wheel. In carrying out my invention I provide a pair of bracket plates 1 each having beveled edges as shown clearly in Figure 8 and these plates are placed against portions of the outer faces of the side bars $a$ of the frame with projecting portions of the said bars engaging the beveled parts as shown in Figure 3. Each plate 1 is bolted to a bar $a$ as shown at 2. An elongated tubular bearing member 4 is formed with the lower part of each plate 1 and the parts strengthened by a web 5. The part 4 extends at an angle to the plate and has its major portion extending outwardly from the plate and a side bar $a$ as shown in Figure 2. A substantially L-shaped rod 6 has its short arm 6' passed through each bearing member 4 and said arm is fastened in the bearing member by the bolts 7 as shown in Figure 3. By loosening the bolts the long arm 5 can be adjusted to any desired angle and limited longitudinal adjustment of the short arm in the bearing member 4 is also permitted. The lower end of the long arm of each bar or rod 6 passes through a bearing member 8 and is adjustably 10 held therein by the set screws or bolts 9. A second bearing member 10 is formed with the member 8 and extends substantially at right angles thereto and this member is substantially horizontally arranged and receives the shank 11 on 15 the hub 12 of a disk 13 which is preferably riveted to the flange of the hub as shown at 14. A cap 15 acts to hold the shank 11 in the bearing member 10 and is held in place by a set screw 16 as shown in Figure 4.

By this arrangement the disks can be adjusted toward and away from each other and also arranged at different inclinations and the disks can be raised and lowered to dig more or less into the ground.

A brace 17 connects each of the bearing assemblies 8 and 10, to a side bar $a$, the lower end of the brace being connected by a bolt 18 to a part of the assemblies 8 and 10, the bolt passing through a hole 19 in the assemblies and the upper 30 end of each brace is formed with a longitudinal extending slot 20 through which passes a bolt 21, this bolt passing also through the side bar $a$. Thus these braces can be adjusted to suit the adjustments of the disks.

A scraper shown generally at 22 in Figure 7 is fastened to each side bar $a$ as shown in Figure 1 and engages each disk for removing material therefrom, these scrapers being especially intended for use when the ground is wet and sticky.

Thus I have provided a pair of disk plows for a potato digger to run in front of the carrier and said plows can be adjusted in different ways. These plows will prevent weeds, potato tops and the like from collecting at the front end of or on the carrier and they loosen the dirt and throw the dirt between the rows so that said dirt will cover up weeds and other material which will rot and thus improve the soil.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. An attachment for a potato digger comprising a pair of disks, bearing members for the disks, upwardly extending rods to which the bearing members are adjustably connected, bearing members attached to the frame of the digger and each rod having a substantially horizontal part fitting in one of the last-mentioned bearing members, means for holding said horizontal part of each rod in adjusted position in said bearing member, a brace connected to the lower bearing member and means for adjustably connecting the upper end of each brace to a part of the frame.

2. An attachment for a potato digger comprising a pair of plate-like members adapted to be bolted to portions of the outer faces of the side bars of the frame of the digger, a substantially horizontally arranged bearing member connected to the lower part of each plate, a pair of rods each having a bent end fitting in a bearing member, means for holding said end in adjusted position in said bearing member, a second bearing member adjustably connected to the lower end of the rod, a third bearing member formed with each of the second-mentioned bearing members and extending substantially horizontally, a pair of disks having shanks passing through the third bearing members and rotatably supported therein, a pair of braces each having its lower end pivotally connected to the body composed of said second and third bearing members and a longitudinally extending slot in its upper end and a bolt passing through the slot into a side member of the frame.

PRUDENT BRUN.